Figure 1:
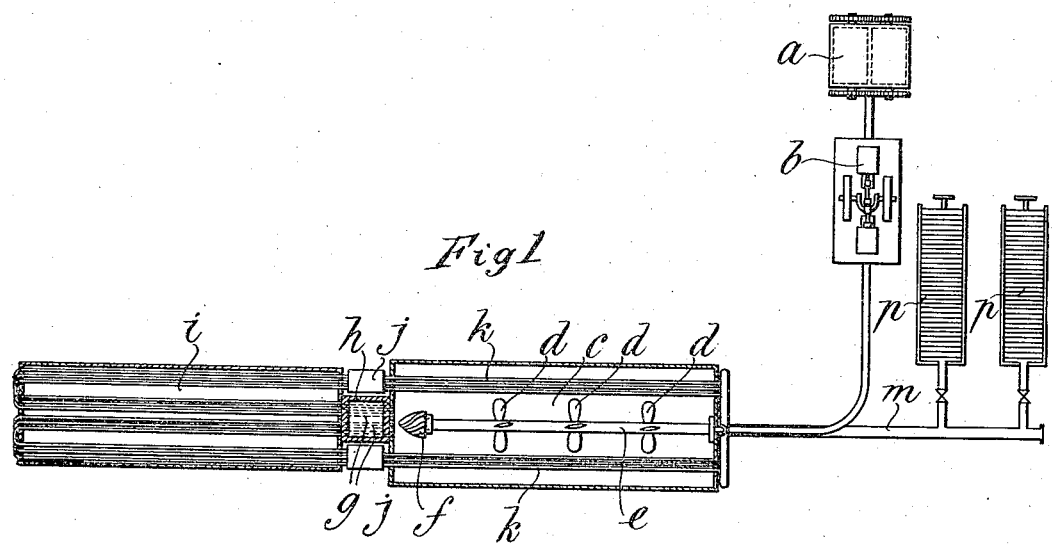

E. A. BUCKLE.
TREATMENT OF PEAT AND THE LIKE.
APPLICATION FILED APR. 19, 1913.

1,083,317.

Patented Jan. 6, 1914.
2 SHEETS—SHEET 1.

Witnesses.
M. E. Burrell
C. B. Franzoni

Inventor.
Edmund Arthur Buckle
By his Attorneys
Baldwin Wight

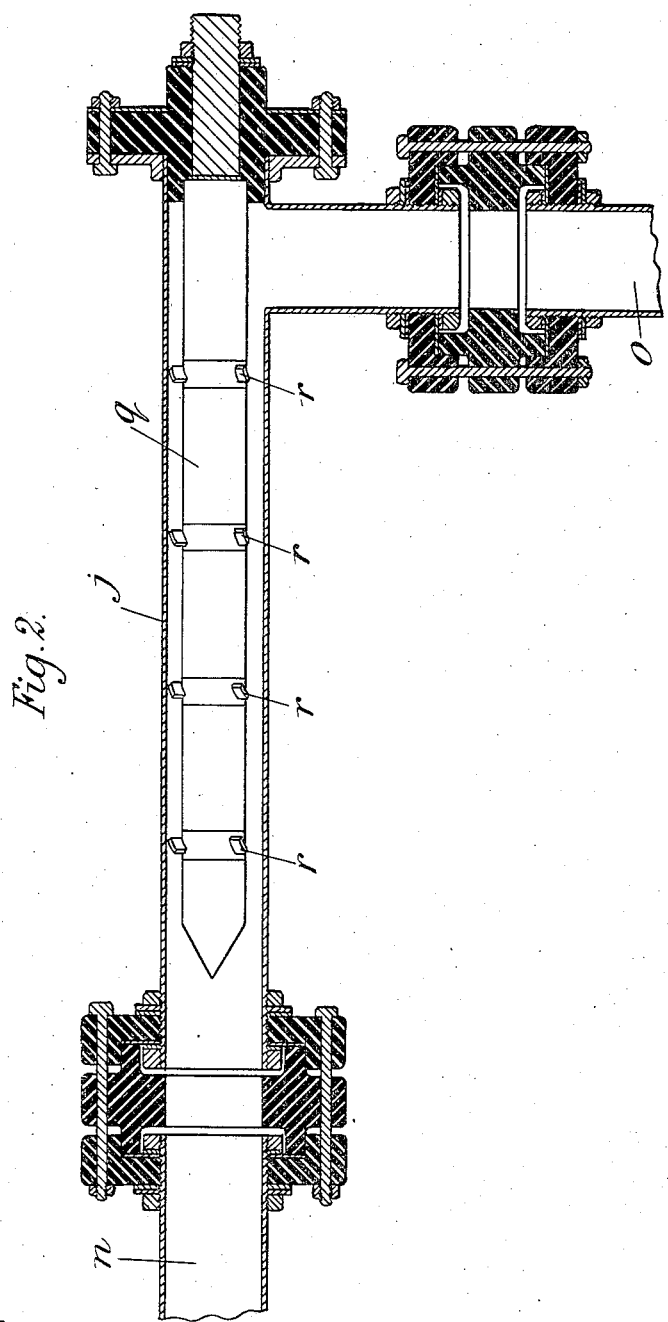

UNITED STATES PATENT OFFICE.

EDMUND ARTHUR BUCKLE, OF PRESTWICH, ENGLAND, ASSIGNOR TO THE INTERNATIONAL NITROGEN AND POWER COMPANY, LIMITED, OF LONDON, ENGLAND.

TREATMENT OF PEAT AND THE LIKE.

1,083,317.  Specification of Letters Patent.  Patented Jan. 6, 1914.

Application filed April 19, 1913. Serial No. 762,347.

*To all whom it may concern:*

Be it known that I, EDMUND ARTHUR BUCKLE, a subject of the King of Great Britain, residing at Beech Villa, Guest Road, Prestwich, Manchester, England, have invented new and useful Improvements in the Treatment of Peat and the like, of which the following is a specification.

This invention relates to the treatment of peat and the like whereby it is freed from its natural water.

It is known that when peat in an admixture with water is heated to a temperature of 180° C. to 200° C. under a pressure of 20 to 25 atmospheres, the natural water of the peat is rendered expressible without any substantial decomposition of the peat taking place. It has also been proposed with a like object to subject peat to electro-osmosis in one instance under slight pressure and in another case at a temperature above the normal.

The present invention is based upon investigations carried out with a view to ascertaining the most favorable conditions for the treatment of peat with a view to rendering its natural water expressible without any material decomposition of the peat. Such investigations have demonstrated that at temperatures below 85° C. peat is so bad a conductor that no electro-osmotic process can be advantageously applied. At 85° C. however, the peat is conductive and if a current is passed for a sufficiently prolonged period, the desired change in the peat ensues with more or less completeness.

According to the present invention an electric current is passed through peat heated to a temperature of at least 100° C. under a pressure sufficient to prevent the formation of steam. The electric current may be continuous or alternating but a continuous current is preferred as with it in general a lower temperature suffices than is required with an alternating current to produce as good result. The voltage may vary within wide limits but a voltage of about 200 has been found to be on the whole the most economical. As stated above the temperature used is at least 100° C. and the range of 100° to 120° C. with a pressure of about 10 atmospheres is preferred but much higher temperatures with correspondingly increased pressure may be used.

If the temperature exceeds 150° C. which is the lowest at which it is believed the hydrocellulose of peat is decomposed by heating peat with water under pressure without the passage of electric current, the electric current so accelerates the decomposition as to make the process economically advantageous as compared with the case where other conditions being the same no current is employed.

In the accompanying drawings, Figure 1 is a diagram of apparatus which may be employed in carrying out my invention. Fig. 2 is a detail view on an enlarged scale of one of the electrolyzing chambers forming part of the apparatus shown in Fig. 1.

The invention may be carried out in the following manner:

Peat pulp from a disintegrator $a$ is forced by a pump $b$ at a pressure of ten atmospheres into a feed tank $c$ in which are paddles $d$ mounted on a shaft $e$ having at its end a screw $f$. From the tank $c$ the peat pulp is forced through tubes $g$ preferably of elliptical cross section which tubes pass through a chimney $h$ and then through a liquid heat conducting medium contained in a boiler $i$ and heated to a temperature of preferably about 120° C. The peat pulp is forced under a pressure of ten atmospheres through the tubes $g$ at such a rate that the temperature of the peat pulp at the outlet of the heating chamber is at least 100° C. If the tubes are circular their diameters would usually be from one to three inches and the boiler $i$ may be twenty feet long. The peat pulp then passes to one or other of the electrolyzing chambers $j$ one of which is shown in detail in Fig. 2. The chamber illustrated in this figure is designed to be part of an apparatus in which the boiler $i$ is turned at a right angle to the tank $c$, the end $n$ communicates with the boiler and the end $o$ with the tank. In the chamber $j$ is an electrode $q$ consisting of a metallic rod insulated electrically from the rest of the apparatus and provided with baffle plates $r$ so arranged that the peat pulp is forced into close contact with the electrodes. As the heated peat pulp traverses the chambers $j$ a continuous electric current of two hundred volts is passed through it, the peat pulp being thrown into a state of osmotic action, producing a rapid and complete disintegration of the cellular structure of the peat and thus allowing the decomposition of the hydrocellulose to take place. If the passage of the peat pulp between the electrodes be arrested, the electrical current automatically ceases to flow as the peat ceases to conduct electricity immediately the hydro-cellulose in it is decomposed. From the chambers $j$ the peat pulp enters tubes $k$ extending through the feed tank $c$ giving up its heat to the pulp in it. The cool peat from the tubes $k$ then enters into a main $m$ leading to filter presses $p$ in which the water is removed by the action of a very slight pressure.

Means should be provided to change the direction of flow of the electric current, i. e., to change the polarity of the electrode and so prevent any accumulation of peat material on the positive electrode.

The peat may be used in the manufacture of producer or other gas, sulfate of ammonia being obtained as a by-product.

A proportion of lime (either as carbonate or hydrate) may be added to the peat pulp before it is treated by this process, to assist in the decomposition of the hydro-cellulose, and to prevent any corrosion of the apparatus by combining with any acid produced by the reaction. If it be desired to regain the nitrogen contained in the peat, in the form of ammonia it is advisable not to make the peat mixture alkaline.

It may be pointed out that the passage of the electric current does not heat the peat to any appreciable extent, and that the disintegration of the cellular structure of the peat allowing the decomposition of the hydrocellulose in the process the subject of the present invention is not due to heat generated by the electric current acting as an electrical heater.

What is claimed is:—

1. In a process for the extraction of water from peat and like substances, passing an electric current through a pulp of the same heated to a temperature of at least 100° C. under a pressure such that no steam is produced substantially as described.

2. In a process for the extraction of water from peat and like substances passing an electric current through a pulp of the same heated to a temperature of 100 to 120° C. under a pressure of about ten atmospheres substantially as described.

EDMUND ARTHUR BUCKLE.

Witnesses:
 SAMUEL COLEY FOYNLECE,
 ADA MOORES.